UNITED STATES PATENT OFFICE.

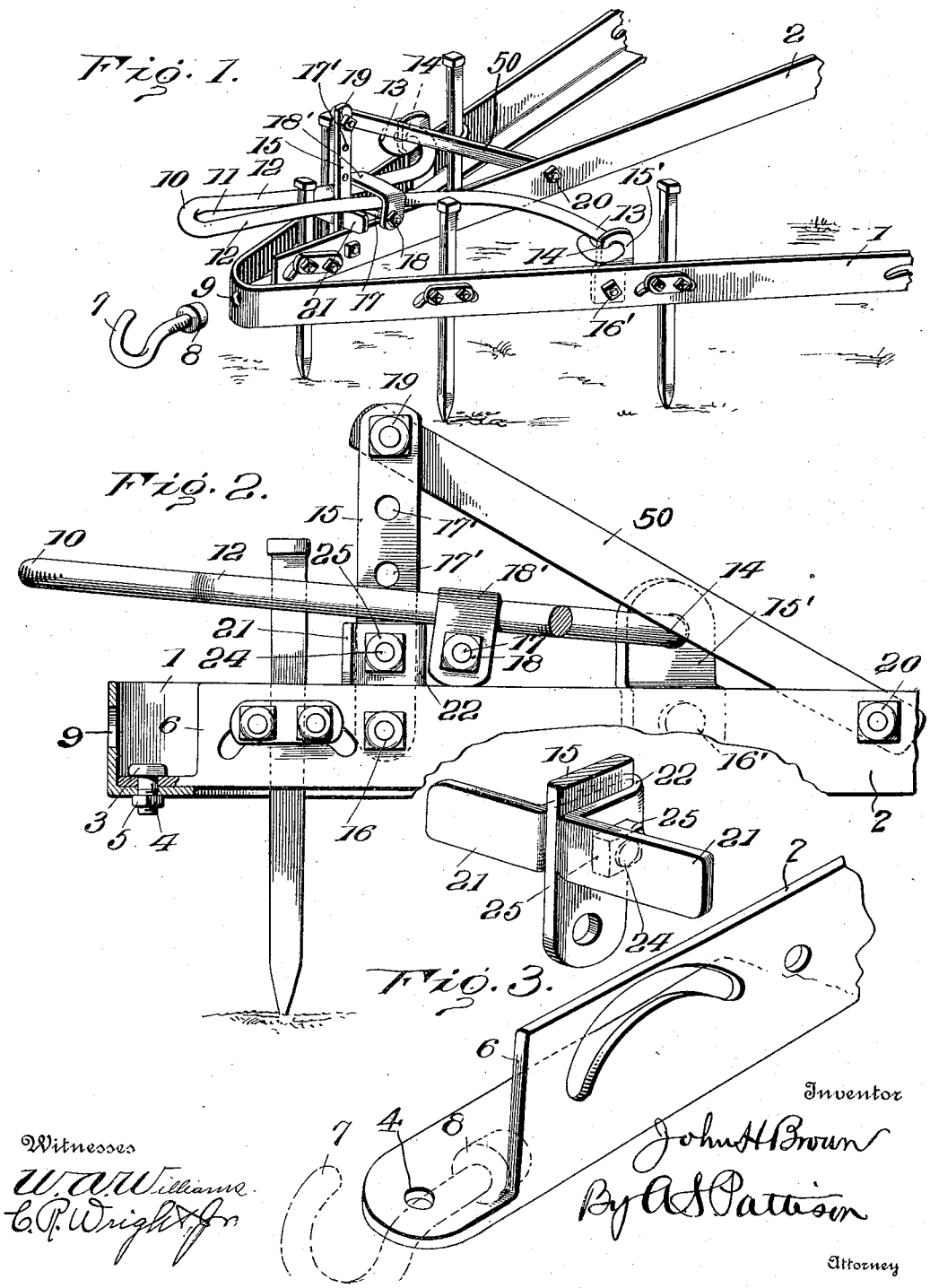

JOHN HOOD BROWN, OF MORLEY, MISSOURI.

DRAFT APPLIANCE FOR HARROWS.

1,124,848.  Specification of Letters Patent.  Patented Jan. 12, 1915.

Application filed December 11, 1913. Serial No. 806,008.

*To all whom it may concern:*

Be it known that I, JOHN H. BROWN, a citizen of the United States, residing at Morley, in the county of Scott and State of Missouri, have invented certain new and useful Improvements in Draft Appliances for Harrows, of which the following is a specification, reference being had therein to the accompanying drawing.

My invention relates to improvements in draft appliances for harrows, and is particularly designed to be used in conjunction with a harrow, the frame of which is constructed of L-shaped beams.

The primary object of my present improvement is to provide a draft appliance applicable to a harrow which is adapted to be drawn singly or connected to a gang of harrows.

Another object of the present invention is to so construct the draft appliance that the angle of draft may be adjusted at the will of the operator.

In the accompanying drawing: Figure 1 is a perspective view of the apex of a harrow of the A or V-shape type, showing my improved draft appliance applied thereto. Fig. 2 is a side elevation of the apex of a harrow of the A or V-shape type, showing in detail the adjustable draft appliance. Fig. 3 is a detail view of a portion of the central support bar of the harrow and a detail view of the rest for the draft appliance.

Referring now to the drawings in which like reference numerals designate similar parts, 1 represents the outer frame of a harrow of the A or V-shape type, the frame, as shown, being constructed of L-shaped beams. Both sides of the outer frame which forms an isosceles triangle, are made from a a single piece of metal which is bent in the center to form the apex, or what is generally termed the nose of the harrow. Bisecting the angle formed between the legs of the frame 1 is a beam 2 also constructed of an L-shaped beam. The beam 2 is fastened to the apex of the frame 1 of the harrow by a bolt 3, which passes through an opening 4 in the horizontal leg of the L-shaped beam 2, and through a registering opening made in the horizontal leg of the L-shaped frame 1. The connection between the beam 2 and the frame 1 is made rigid by a nut 5, which is screwed on the bolt 3. A portion of the vertical leg of the L-shaped beam 2 is cut away as shown at 6. This construction is clearly shown in Fig. 3. This portion 6 forms a stop for a hook 7, which has its inner end 8 resting against the aforesaid stop, and its outer end passing through a hole 9 in the vertical leg of the frame at its apex. The distance between the lip or stop 6 and the hole 9, made in the apex of the frame 1, is less than the length of the shank of the hook 7, and consequently when the hook 7 has been placed in its position in the hole 9 and the beam 2 screwed in position on the frame 1, it is impossible to dislodge the hook by moving it either forward (for the enlarged inner end 8 is larger than the hole) nor slip backward, for the reason that the base 8 will come in contact with the stop 6. The hook 7 forms the draft appliance for connecting several harrow sections together into gangs, due to the fact that the hook 7 is at the extreme apex of the V-shaped harrow frame. When it is connected to the harrow frame preceding it, it will insure a direct and steady pull no matter where it is connected.

My main draft appliance which is adapted to be connected to the whiffletrees, where animals are used to draw the harrow, or to any suitable connecting place where an engine or other power is used, consists, first, of a member 10, which consists of an eye 11, and portions 12 which are rearwardly extended and bent at 13 to form eyes 14. These eyes 14 are connected to blocks 15', which are bolted to the frame 1, by means of bolts 16'. The portions 12 of the member 10 are extended inwardly for some distance parallel one to the other but when strain is applied to the eye 11, the tendency would be to spread these portions 12. To prevent this spreading, a U-shaped brace 18' is placed over the said members 12, the parallel legs of which are drawn together by means of a bolt 17 and nut 18. When the legs of the U-shaped brace 18' are drawn together, the parallel portions 12 of the member 10 will consequently be drawn one toward the other and hold them in this clamped position.

For different kinds of cultivating, it is essential that the draft and pull on a harrow should be varied to different heights in order to attain a deep or light cultivation of the ground. In order to insure this advantage, the pull on the member 10 which is the draft appliance of the harrow may be raised or lowered at the will of the operator. This raising and lowering of the member 10 changes the angle or pull on the harrow. In order to insure uniform cultivation, it is necessary that the angle of draft should run consistently and to attain this result, I provide an adjusting means for holding the member in any desired position. This adjusting means consists of a vertical bar 15, which has its lower end bolted to the vertical leg of the beam 2, which passes through the parallel portions 12 of the draft member 10. This bar 15 is provided with a series of holes 17' and a rearwardly extending brace 50, which has one end 19 bolted to the upper end of the bar 15, and its other end 20 bolted to the L-shaped beam 2, in rear of the vertical member 15. A rest 21, which is constructed of a bar having a rearwardly extending U-shaped portion 22, adapted to fit around the bar 15, provides means for supporting the draft member 10 at any desired angle. This rest has two communicating openings, which may be placed so as to register with any one of the openings 17'. A bolt 24 carrying a nut 25 on its outer end may then be passed through the registering openings which will hold the rest in its adjusted position.

As is apparent from the foregoing description, my draft appliance consists of two parts, one of which is adapted to be used when the harrow is connected to other harrows in the formation of a gang, and the other draft appliance to be used when the harrow is drawn either singly or forms the connection for the gang to the draft power.

Having thus described my invention, what I claim and desire to secure by Letters Patent is:

1. The combination with a harrow, of the V-shape type, of a draft appliance applied thereto, said draft appliance comprising a relatively U-shaped member having its ends connected to the isosceles legs of said harrow, a brace arranged across the parallel legs of the said U-shaped member, and adjusting means situated between the relatively parallel legs of the U-shaped member, the said parts arranged as and for the purpose described.

2. A draft appliance for a harrow, of the V-shape type, consisting of a relatively U-shaped member having its ends connected to the ends of the isosceles legs of the said harrow, a brace encircling the parallel portions of the said U-shaped member, a vertical bar carried by the harrow frame and arranged between the relatively parallel portions of the U-shaped member, and carrying means for holding the said member 10 in any desired vertical position.

3. The combination with a harrow, of a draft appliance applied thereto, said draft appliance comprising a relatively U-shaped member having its ends connected to the isosceles legs of the said harrow, a brace arranged across the parallel legs of the U-shaped member, whereby the said member is prevented from spreading when power is applied thereto.

4. A draft appliance for a harrow consisting of a relatively U-shaped member having its ends connected to the ends of the isosceles legs of the said harrow, a brace encircling the parallel portions of the said member, and adjusting means situated between the relatively parallel legs of the U-shaped member, the parts arranged as and for the purpose described.

In testimony whereof I hereunto affix my signature in the presence of two witnesses.

JOHN HOOD BROWN.

Witnesses:
C. W. FULWOOD,
BRIGGS CARSON.

Copies of this patent may be obtained for five cents each, by addressing the "Commissioner of Patents, Washington, D. C."